United States Patent
Anderson et al.

(10) Patent No.: US 12,158,787 B2
(45) Date of Patent: Dec. 3, 2024

(54) PER OUTLET RESIDUAL CURRENT MONITORING FOR POWER DISTRIBUTION UNITS

(71) Applicant: Server Technology, Inc., Reno, NV (US)

(72) Inventors: Swen Anderson, Limbach-Oberfrohna (DE); Michael Suchoff, Palm Beach, FL (US); James P. Maskaly, Reno, NV (US)

(73) Assignee: LEGRAND DPC, LLC, Reno, NV (US)

( * ) Notice: Subject to any disclaimer, the term of this patent is extended or adjusted under 35 U.S.C. 154(b) by 135 days.

(21) Appl. No.: 17/833,652

(22) Filed: Jun. 6, 2022

(65) Prior Publication Data

US 2023/0393638 A1 Dec. 7, 2023

(51) Int. Cl.
G06F 1/26 (2006.01)
(52) U.S. Cl.
CPC .................... G06F 1/266 (2013.01)
(58) Field of Classification Search
CPC ........................................ G06F 1/266
USPC ................... 324/511, 510, 509, 500
See application file for complete search history.

(56) References Cited

U.S. PATENT DOCUMENTS

| | | |
|---|---|---|
| 4,725,913 A | 2/1988 | Dhar |
| 7,043,543 B2 | 5/2006 | Ewing et al. |
| 7,271,502 B1 * | 9/2007 | Remaker ............... G06F 1/266 |
| | | 361/641 |
| 7,368,830 B2 | 5/2008 | Cleveland et al. |
| 7,977,815 B2 | 7/2011 | Ewing et al. |
| 8,305,737 B2 | 11/2012 | Ewing et al. |
| 8,321,163 B2 | 11/2012 | Ewing et al. |
| 8,494,661 B2 | 7/2013 | Ewing et al. |
| 8,694,272 B2 | 4/2014 | Ewing et al. |
| 8,907,678 B2 | 12/2014 | Suchoff |
| 9,201,481 B2 * | 12/2015 | Hirosaka .................. H02J 3/14 |
| 9,411,021 B2 | 8/2016 | Suchoff |
| 9,614,335 B2 | 4/2017 | Irons |
| 9,627,828 B2 | 4/2017 | Irons |
| 9,952,261 B2 | 4/2018 | Ewing et al. |

(Continued)

FOREIGN PATENT DOCUMENTS

CN 212275900 U 1/2021

OTHER PUBLICATIONS

"How does residual current monitoring work?" accessed Apr. 8, 2022 from https://www.benderinc.com/know-how/technology/tn-s-tt-system/how-does-residual-current-monitoring-work, 4 pages.

(Continued)

*Primary Examiner* — Giovanni Astacio-Oquendo
(74) *Attorney, Agent, or Firm* — Maynard Nexsen PC; Michael Henson

(57) ABSTRACT

Power distribution systems and methods in which a power distribution unit (PDU) is provided with residual current monitoring at multiple outlets of an outlet module in a PDU. A residual current monitoring circuit of the PDU includes at least one current sensor associated with the outlets of the PDU to detect residual current for each of the outlets. The methods of residual current detection in a PDU having multiple power outlets includes detecting current leakage at each outlet as a difference between supplied current and return current for each outlet.

31 Claims, 11 Drawing Sheets

(56) References Cited

U.S. PATENT DOCUMENTS

| | | | |
|---|---|---|---|
| 10,249,998 B2 | 4/2019 | Irons et al. | |
| 10,498,096 B2 | 12/2019 | Irons et al. | |
| 10,677,823 B2 | 6/2020 | Ferguson | |
| 10,996,248 B2 | 5/2021 | Ferguson | |
| 2005/0203987 A1* | 9/2005 | Ewing | G06F 1/3209 |
| | | | 709/200 |
| 2008/0180866 A1 | 7/2008 | Wong | |
| 2009/0251832 A1 | 10/2009 | Brugner et al. | |
| 2011/0166719 A1* | 7/2011 | Pasek | G01R 31/50 |
| | | | 700/291 |
| 2013/0289789 A1 | 10/2013 | Ewing et al. | |
| 2015/0311862 A1 | 10/2015 | Lee | |
| 2018/0157284 A1 | 6/2018 | Ewing et al. | |
| 2018/0196098 A1 | 7/2018 | Ferguson | |
| 2019/0148928 A1 | 5/2019 | Oms | |
| 2020/0019220 A1* | 1/2020 | Huang | G06F 1/3234 |
| 2020/0400728 A1 | 12/2020 | Ferguson | |
| 2021/0036494 A1 | 2/2021 | Ewing et al. | |
| 2021/0288434 A1 | 9/2021 | Ramsey et al. | |
| 2021/0313827 A1 | 10/2021 | Pachoud et al. | |
| 2022/0037844 A1 | 2/2022 | Irons et al. | |
| 2022/0413062 A1 | 12/2022 | Liu et al. | |
| 2023/0038103 A1* | 2/2023 | Kinuta | H02J 9/062 |
| 2023/0127478 A1 | 4/2023 | Ferguson | |
| 2023/0184812 A1 | 6/2023 | Ferguson et al. | |

OTHER PUBLICATIONS

Bender GmbH & Co. KG, Residual current monitoring—Product Overview, Jan. 2021, 32 pages.

Raritan, Educational Brief—Residual Current Monitoring, 2018; 2 pages.

Raritan, Residual Current and Neutral Monitoring in the Data Center, White Paper, 12 pages.

International Search Report and Written Opinion of International Application No. PCT/US2023/024555; Date of Mailing: Oct. 12, 2023; 25 pages.

* cited by examiner

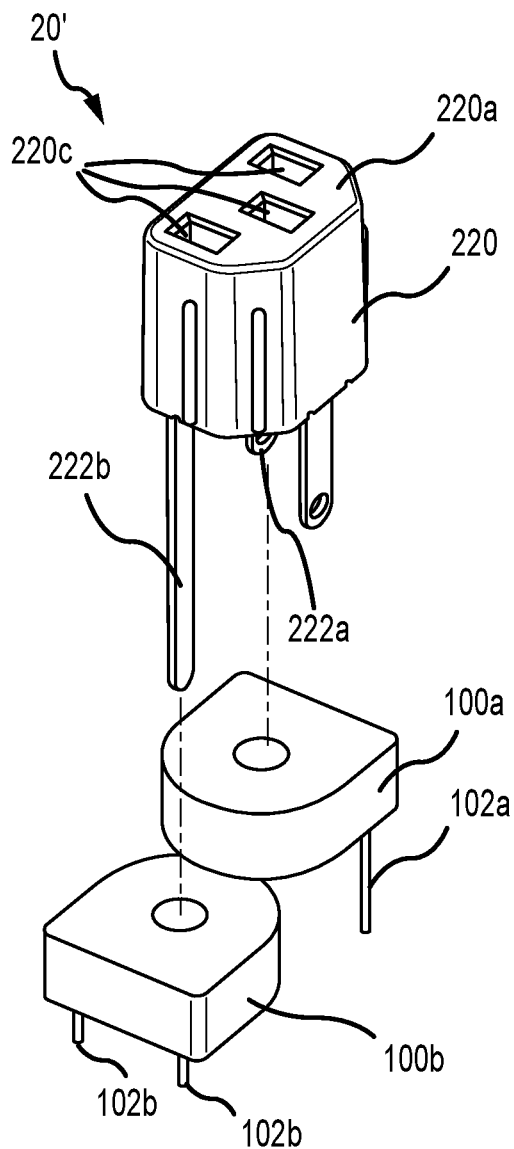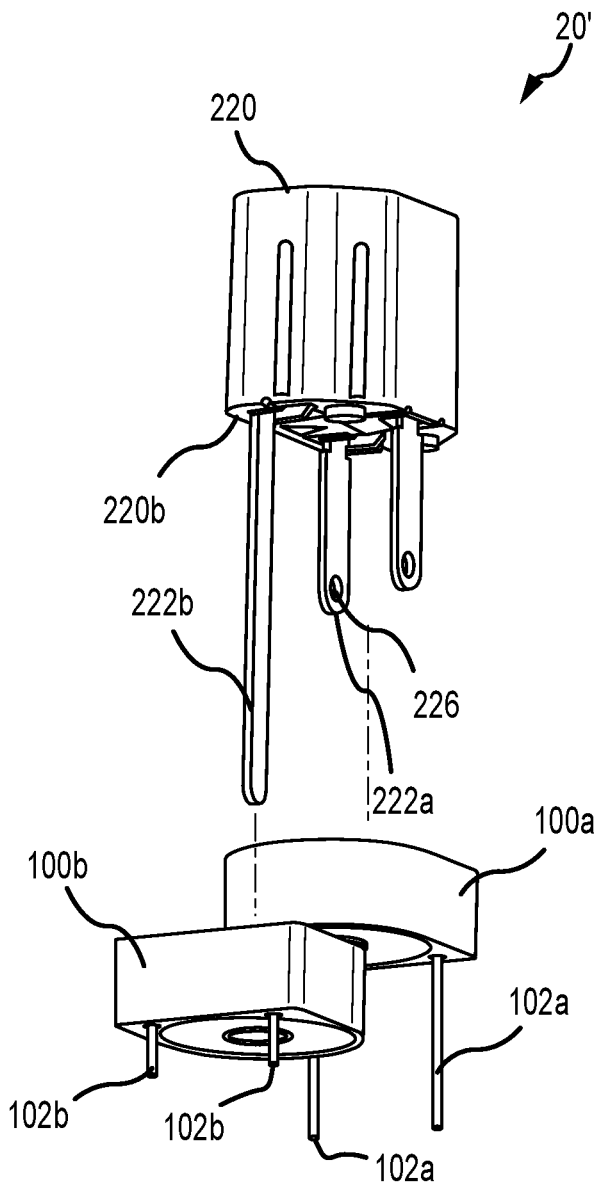
FIG.6
FIG.7

PER OUTLET RESIDUAL CURRENT MONITORING FOR POWER DISTRIBUTION UNITS

TECHNICAL FIELD

The present disclosure is generally directed to power distribution units that are configured to reduce electrical hazards. More specifically, the disclosure is directed to power distribution units that provide for residual current monitoring at the outlets of the power distribution unit.

BACKGROUND

A conventional power distribution unit (PDU) is an assembly of electrical outlets (also called receptacles) that receive electrical power from a source and distribute the electrical power to one or more separate electronic appliances. Each such PDU assembly has a power input that receives power from one or more power sources through a power cord of the PDU. The power outlets can be used to provide power to one or more electronic appliances plugged into the PDU outlets. PDUs are used in many applications and settings such as, for example, in or on electronic equipment racks.

A common use of PDUs is supplying operating power for electrical equipment in computing facilities, such as enterprise data centers, multi-tenant hosting environments like colocation facilities, cloud computing, and other data center types. Such computing facilities may include electronic equipment racks that comprise rectangular or box-shaped housings sometimes referred to as a cabinet or a rack and associated components for mounting equipment, associated communications cables, and associated power distribution cables. Electronic equipment may be mounted in such racks so that the various electronic devices (e.g., network switches, routers, servers and the like) are mounted vertically, one on top of the other, in the rack. One or more PDUs may be used to provide power to the electronic equipment. Multiple racks may be oriented side-by-side, with each containing numerous electronic components and having substantial quantities of associated component wiring located both within and outside of the area occupied by the racks. Such racks commonly support equipment that is used in a computing network for an enterprise, referred to as an enterprise network. Enterprise data centers, multi-tenant hosting environments like colocation facilities, cloud computing, and other data center types are often critical for business operations. Therefore, it is important that the electrical connections between a PDU and its associated servers, storage, and network equipment is secure in order to maintain equipment up time to reliably support the enterprise users.

Data centers, with their reliance on high voltage distribution, have the potential to subject operators and maintenance personnel to serious injury should an electrical fault occur if any of the safety features designed into the power distribution system is compromised. One such safety feature is the insulation surrounding hazardous voltage conductors. If this insulation is compromised due to age, mechanical stress or damage during installation it may present a lethal hazard to personnel working in and around this wiring. In addition, electrical infrastructure components and IT loads, attached to the distribution systems, have components that may fail and provide electrical paths for leakage currents that may be hazardous should a person physically come into contact with these devices.

For these reasons there have been industry requirements to proactively identify risks of physical harm to workers in these facilities due to potential Residual Current or leakage. One example is industry standard DIN VDE 0105-100 VDE 0105-100:2015-10: Operation of electrical installations. This standard specifies the need for regular isolation measurements of the power distribution system to identify sources of insulation breakdown. This typically requires removal of power to portions of the power distribution chain so these isolation measurements can be performed. This can be very problematic in a datacenter where uptime is vital and shutdowns become very costly.

In order to minimize this impact on mission critical, high reliability, systems and installations, the standard does allow for extending the time between inspections if continuous monitoring of residual current is in place with alarming capability should an increase in leakage current be detected. Accordingly, demand continues to increase for continuous monitoring and alarming of residual current within a rack PDU. Moreover, continuous residual current monitoring (RCM) is increasingly becoming a mandatory feature in certain jurisdictions.

Current methods for implementing RCM are costly which has limited this monitoring to the power cord on rack mounted PDUs. With typical three-phase power cords capable of supplying 22 KVA (or higher) to IT loads connected to the rack PDU, a significant number of IT loads can be supported by a single power cord (e.g. 48 or more). The predominant solution available today for residual current monitoring (RCM) is at the power cord inlet to the PDU. One example is from Bender, Inc. and shown in its publication, *Product overview: Residual current monitoring* (January 2021), in which line and neutral conductors of the power cord, are first routed through a highly sensitive current transformer and then routed to the IT load(s) attached to the Rack PDU receptacle(s). In a normal operating condition, all the current flowing from the Line conductor should be equal to the current returning via the Neutral conductor so there would be no current present in the secondary winding of the RCM current transformer. Any current detected on the secondary of the RCM transformer represents the amount of leakage current flowing from the Line conductor to protective earth and not the Neutral conductor. It is this leakage current path that becomes hazardous to personnel coming into physical contact with equipment where this leakage current exists.

In another known example of RCM, three phase conductors and a Neutral from a three-phase input power cord) are run through an annular RCM current transformer (CT). The wires from the transformer are then connected to an electrical metering board which converts the transformers secondary current output into a voltage that is digitized by an A/D converter on a microcontroller contained on a printed circuit board within the PDU. Additional wires, wrapped around the core of the transformer, allow for degaussing of the current transformer in order to remove any remnant magnetic field. This can occur following a high current fault event downstream of the PDU.

By using either of these known RCM implementations, an end user can only determine that a fault exists downstream of the input power cord of the rack PDU that is producing excessive residual current flow. These RCM implementations do not provide any additional fault isolation information that would assist personnel in determining whether one or more IT loads are at fault or if the rack PDU has a fault. Thus, although monitoring at the input cord meets the continuous monitoring of residual current requirement, it does not provide the ability to quickly identify the location of the piece of IT equipment, i.e., the particular outlet of the PDU, that is responsible for the excess leakage current. This can lead to excessive downtime in attempting to locate and repair the faulty IT equipment.

In other RCM techniques, additional residual current sensors are provided to sense each phase of a 3-phase power cord and at least identify where the faulted equipment generally exists. For example, in one known RCM arrangement, up to six (6) RCM sensors are attached to each power branch present in the rack PDU. This solution helps to further isolate the residual current fault or leakage down to a branch or collection of outlets. There are primarily two types of known RCM sensors that are contained within rack PDUs: i) Type A, which are used to monitor AC currents ranging from 42-2000 Hz (in accordance with International Electrotechnical Commission Standard, IEC-60755); and ii) Type B, which are used to measure AC currents (up to 2000 Hz) as well pulsating and smooth DC currents in accordance with IEC-60755). Type B RCM monitoring is capable of detecting DC leakage currents (both smooth and pulsating) in addition to AC leakage currents. Type B is useful in PDU applications using switch mode power supply technology for high end servers and IT equipment which can be susceptible to faults due to compromised insulation leading to DC leakage currents. Regardless, although residual current monitoring on a per branch basis is available, this RCM technique still does not provide the ability to quickly identify the outlet location of the attached IT equipment that is responsible for the excess leakage current.

U.S. Pat. Nos. 8,694,272 and 8,305,737 each shows and describes a rack PDU with a power sensing and monitoring system in which each receptacle or outlet includes a single current transformer (CT) to measures current on the power supply line pin of the receptacle. Power sensing and monitoring can be used to provide power related information to entities that supply, deliver, and consume power. U.S. Pat. No. 8,694,272, in particular, describes a PDU with a monitoring system that monitors power consumption at each outlet of the PDU, i.e., "Per Outlet Power Sensing (POPS)". However, neither of these patent documents show or describe residual current monitoring. U.S. Pat. No. 8,907, 678 shows and describes an apparatus and methods for monitoring current leakage from a source of AC power to an IT device, such as a PDU in a data center, but does not provide for identifying a particular outlet and connected source of current leakage.

Accordingly, there remains a need for systems and methods for monitoring residual current at each outlet within the PDU to provide maintenance personnel with additional fault isolation information to allow them to identify and correct the fault condition and restore the affected IT equipment with minimal impact to system uptime.

SUMMARY

Systems and methods are provided for residual current monitoring of PDUs at the outlet level. Preferred embodiments of the PDU provide datacenter IT and facility personnel with enhanced information that allows them to more readily locate a faulted (or failing) piece of IT equipment exhibiting an increase in residual current leakage. Preferred embodiments of a residual current monitoring circuit used in the PDU includes two current sensors associated with an outlet of the PDU to detect a difference in current between the line current supplied to the outlet and the return current from the outlet. Accordingly, preferred methods provide residual current detection in power distribution units having multiple power outlets and detecting current leakage at each outlet as a difference between supplied current and return current for each outlet in the plurality of outlets.

Preferred embodiments of a power distribution unit include a power distribution unit housing and a power source disposed in the housing having a plurality of input conductors. The PDU includes a plurality of outlets disposed in the housing each having a plurality of connectors including a first connector electrically connected to one input conductor and at least a second connector electrically connected to a different input conductor. Each outlet has an associated residual current monitoring circuit having at least a current sensor associated with the first connector and the second connector to determine the residual current for each outlet.

One preferred embodiment of a power distribution unit includes a power distribution unit housing and a power source disposed in the housing having a plurality of input conductors. The PDU includes a plurality of outlets disposed in the housing each having a plurality of connectors including a first connector electrically connected to one input conductor and at least a second connector electrically connected to a different input conductor. Each outlet has an associated residual current monitoring circuit having a first current sensor associated with the first connector to define a first current sense output; and a second current sensor associated with the at least second connector to define a second current sense output. The preferred PDU includes a differential detector coupled to the associated residual current monitoring circuit of each outlet to determine a current difference between the first current sense output and the second sense output of each outlet.

A preferred embodiment of an outlet module includes at least one circuit board; a first pair of current sensors mounted to the at least one circuit board; at least a second pair of current sensors mounted to the at least one circuit board; at least one differential detector mounted to the at least one circuit board to determine a difference between current sense outputs for each pair of current sensors; a first power outlet associated with the first pair of current sensors; and at least a second power outlet associated with the at least second pair of current sensors.

BRIEF DESCRIPTION OF THE DRAWINGS

A further understanding of the nature and advantages of the present technology may be realized by reference to the following drawings. In the appended figures, similar components or features may have the same reference label.

FIGS. 6-7 are various exploded perspective views of an outlet for use in the outlet modules of FIGS. 3-5;

DETAILED DESCRIPTION

This description provides examples, and is not intended to unnecessarily limit the scope, applicability or configuration of the invention. Rather, the ensuing description will provide those skilled in the art with an enabling description for implementing embodiments of the invention. Various changes may be made in the function and arrangement of elements. Thus, various embodiments may omit, substitute, and/or add various procedures or components as appropriate. For instance, aspects and elements described with respect to certain embodiments may be combined in various other embodiments. It should also be appreciated that the following systems, devices, and components may individually or collectively be components of a larger system, wherein other procedures may take precedence over or otherwise modify their application.

Exemplary preferred embodiments of a power distribution unit (PDU) are described herein. The present disclosure provides exemplary embodiments with capability to determine the residual or current leakage at each outlet of the PDU. The preferred PDU with its multiple outlets and method of residual current monitoring on a per outlet basis facilitates efficient determination of the source of the leakage current. With this knowledge, data center downtime can be minimized and/or electrical hazards to personnel can be minimized or eliminated.

Figure 1:
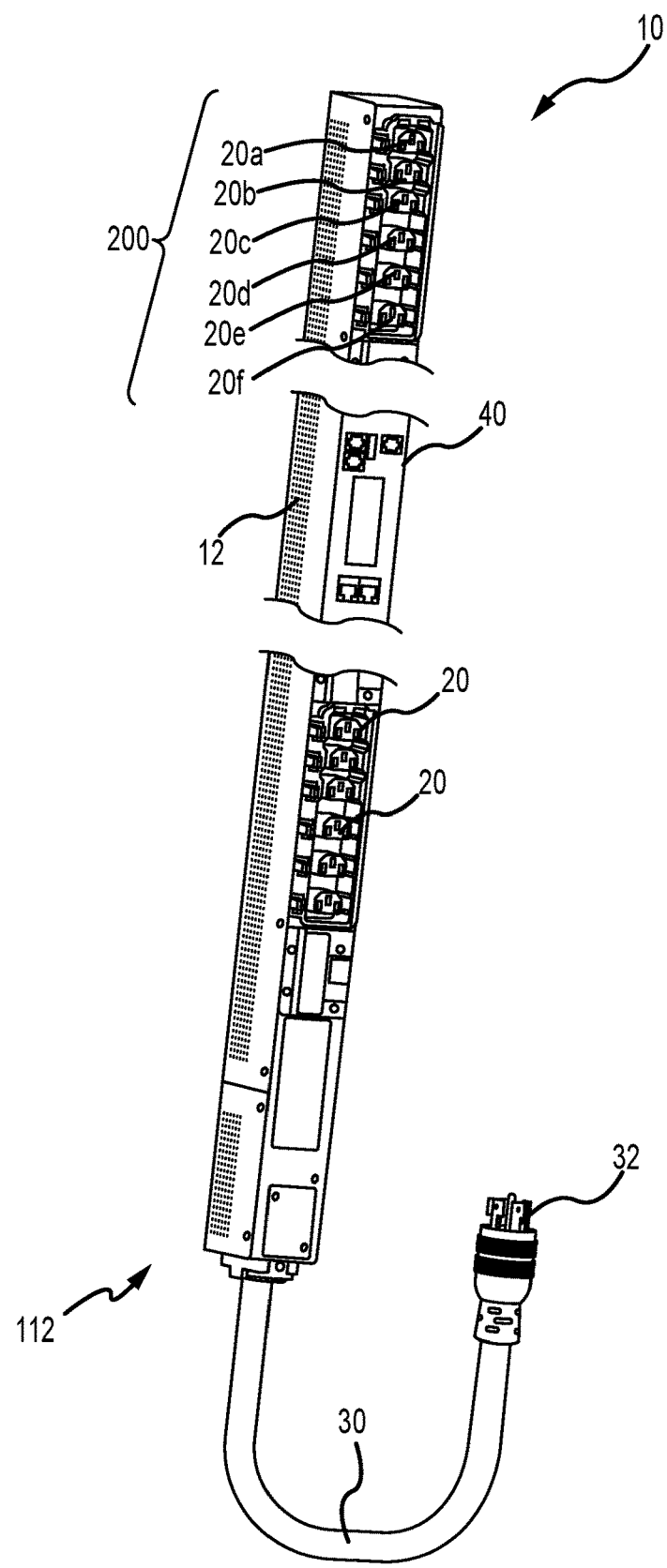
FIG. 1 is an illustration of a preferred embodiment of a power distribution unit (PDU)

Shown in FIG. 1 is an illustrative embodiment of a PDU 10 that includes a housing 12 with a plurality of outlets 20 (also called "receptacles" or "outputs") mounted therein to supply power to individual assets or devices, for example, assets that are used in operation of a data center. The assets may be mounted into an equipment rack and appropriately plugged into one of the outlets 20 of the PDU. Accordingly, the PDU 10 can be configured for mounting vertically or horizontally. To supply and distribute power to the connected assets through the outlets 20, the PDU 10 is configured for internal receipt of a power input. As shown, the PDU can include an internally wired input power cord 30 that extends externally and terminates with an associated plug 32 for connection to a power source in a traditional plug and receptacle connection. Alternatively, the PDU 10 can be configured to be internally hard wired to the external power source. The PDU 10 can include a visual display portion 40 to display monitored information, for example, an indication of which outlet of the PDU has detected current leakage. The visual display can display other information such as, for example, power consumption, voltage, and/or current on a per outlet basis. Alternatively or additionally, the PDU 10 can be coupled to an external display to convey such information. The outlets 20 can be grouped and configured to define one or more outlet modules 200 as described herein. For example, each outlet module 200 of the PDU 10 shown preferably includes six outlets 20a-20f. It should be understood however that preferred embodiments of the outlet module 200 can include fewer or more outlets 20 provided that at least one outlet and preferably more than one outlet is configured with residual current monitoring in a manner as described herein.

Figure 2:
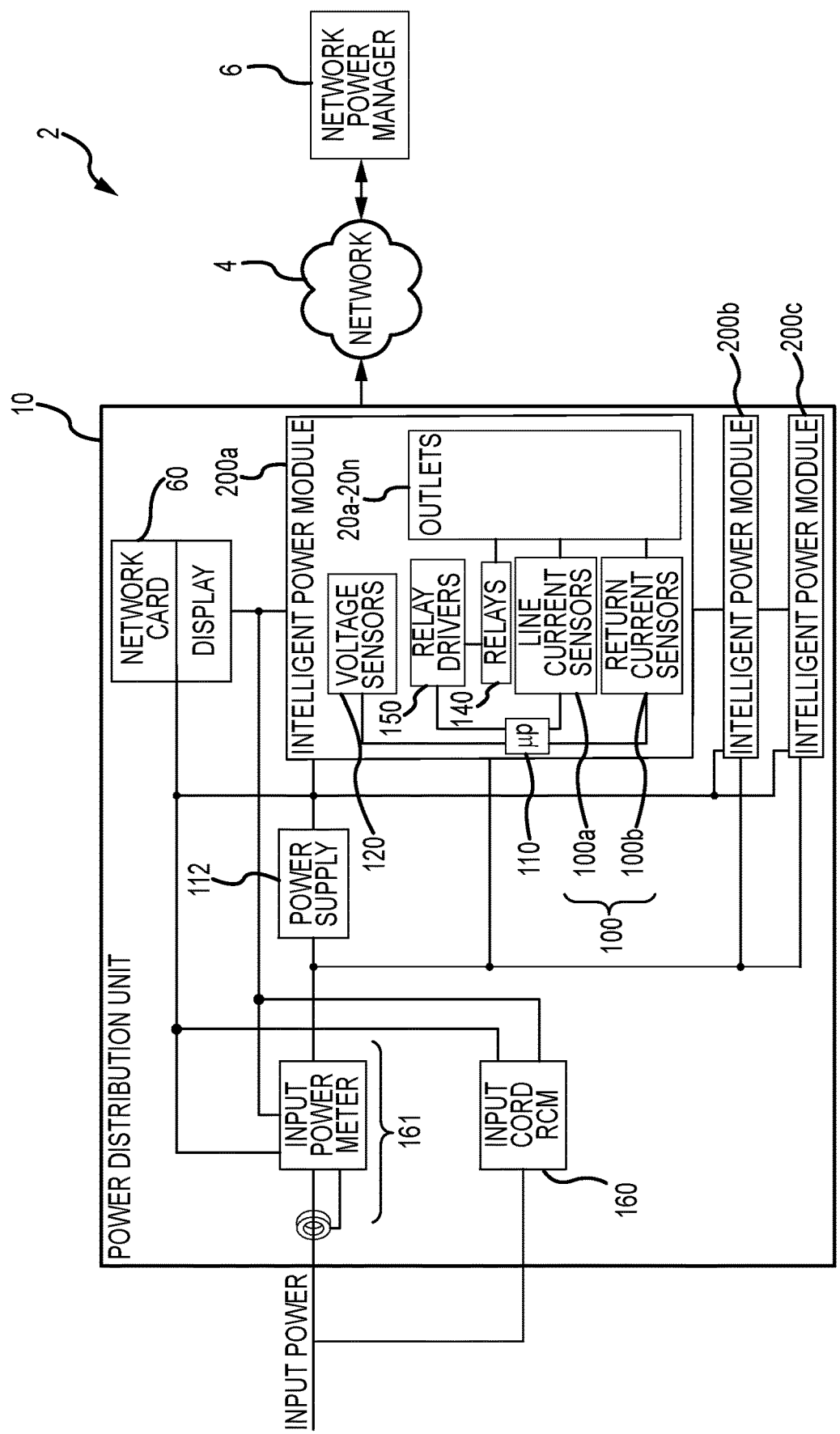
FIG. 2 is a partial block wiring diagram of the PDU of FIG. 1 connected to a power input and network.

Shown in the block diagram of FIG. 2 is an illustrative system 2 that includes the preferred PDU 10 to supply power to one or more associated computing assets, such as for example, devices of a computing network 4. The PDU 10 can communicate over the computer network 4 with a data center operator or a networked application such as, for example, a power manager application 6 using a workstation or other device used in the management of the data center or other enterprise and that is connected with the network 4. As schematically shown, a preferred outlet module 200 of the PDU 10 is wired and configured with a residual current monitoring (RCM) circuit 100 that detects or determines residual current or leakage for each outlet 20a-20n of the modules 100. Accordingly, preferred embodiments of the PDU 10 are configured to provide residual current monitoring on a "per outlet" basis. Generally, each outlet has an associated RCM circuit 100 that preferably includes a first current sensor 100a and a second current sensor 100b in combination with a differential detector 110. In an AC environment, the first current sensor 100a and the second current sensor 100b may also be used to determine, alternately, the current supplied to the associated outlet 20 and returning through the outlet. Each sensor 100a, 100b produces or defines a current sensed output indicative of a detected current that is provided to the differential detector 110. The differential detector 110 determines if there is a difference between current sense outputs of the first and second current sensors 100a, 100b to determine if there is a residual current or leakage. For preferred embodiments described herein, the differential detector 110 is embodied as a microcontroller 110. The microcontroller 110 is preferably configured to communicate detection of a residual current to the display 40 or otherwise communicate a residual current to a networked device or operator over the network 4 to address the issue with appropriate personnel. Accordingly, the PDU 10 preferably includes a network interface card 60 for communication with devices on the network 4 and can also be configured for internal communication between modules 200 of the PDU 10.

Figure 3:
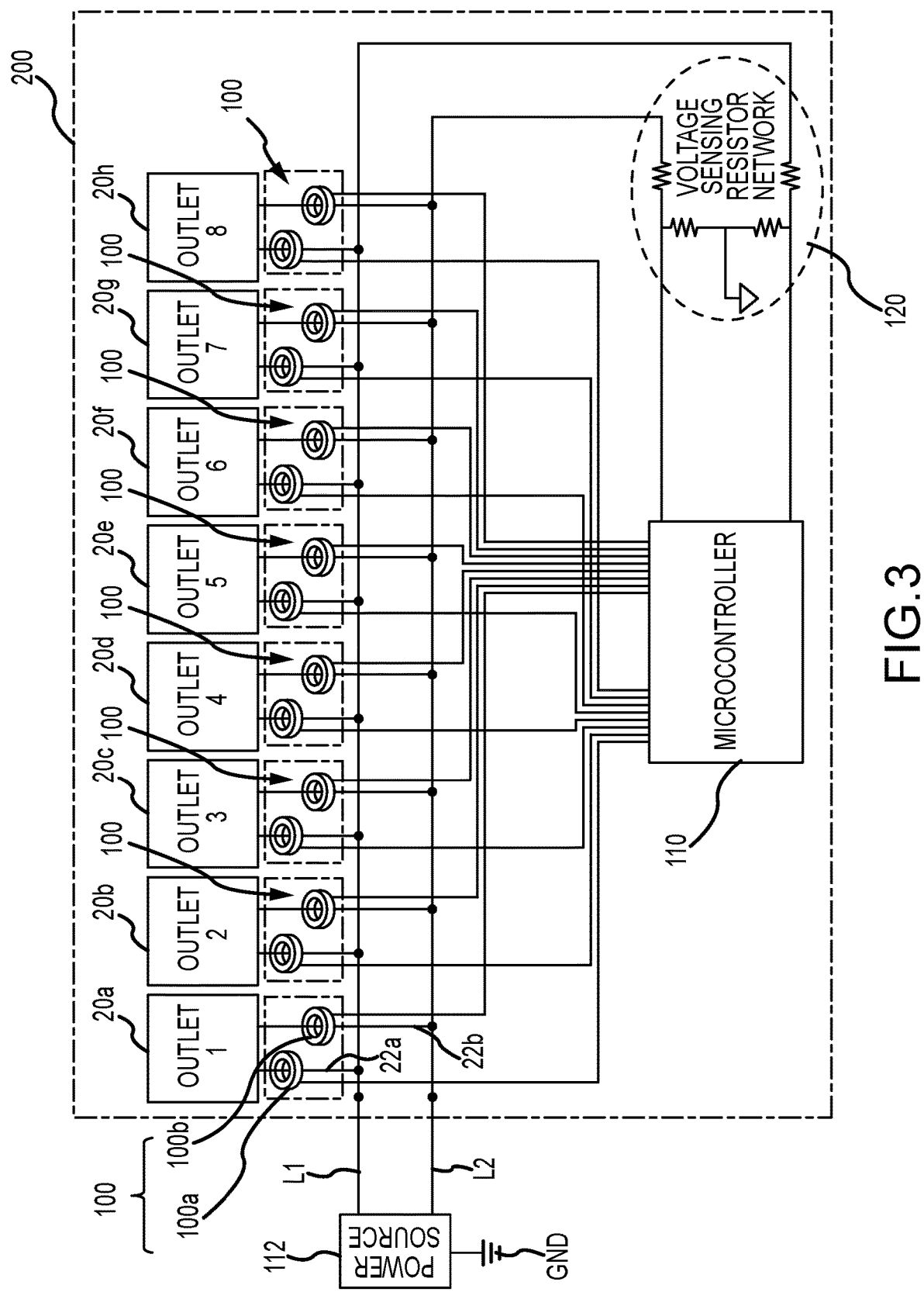
FIG. 3 is a block diagram of one preferred embodiment of an outlet module for use in the PDU of FIG. 1.
Figure 4:
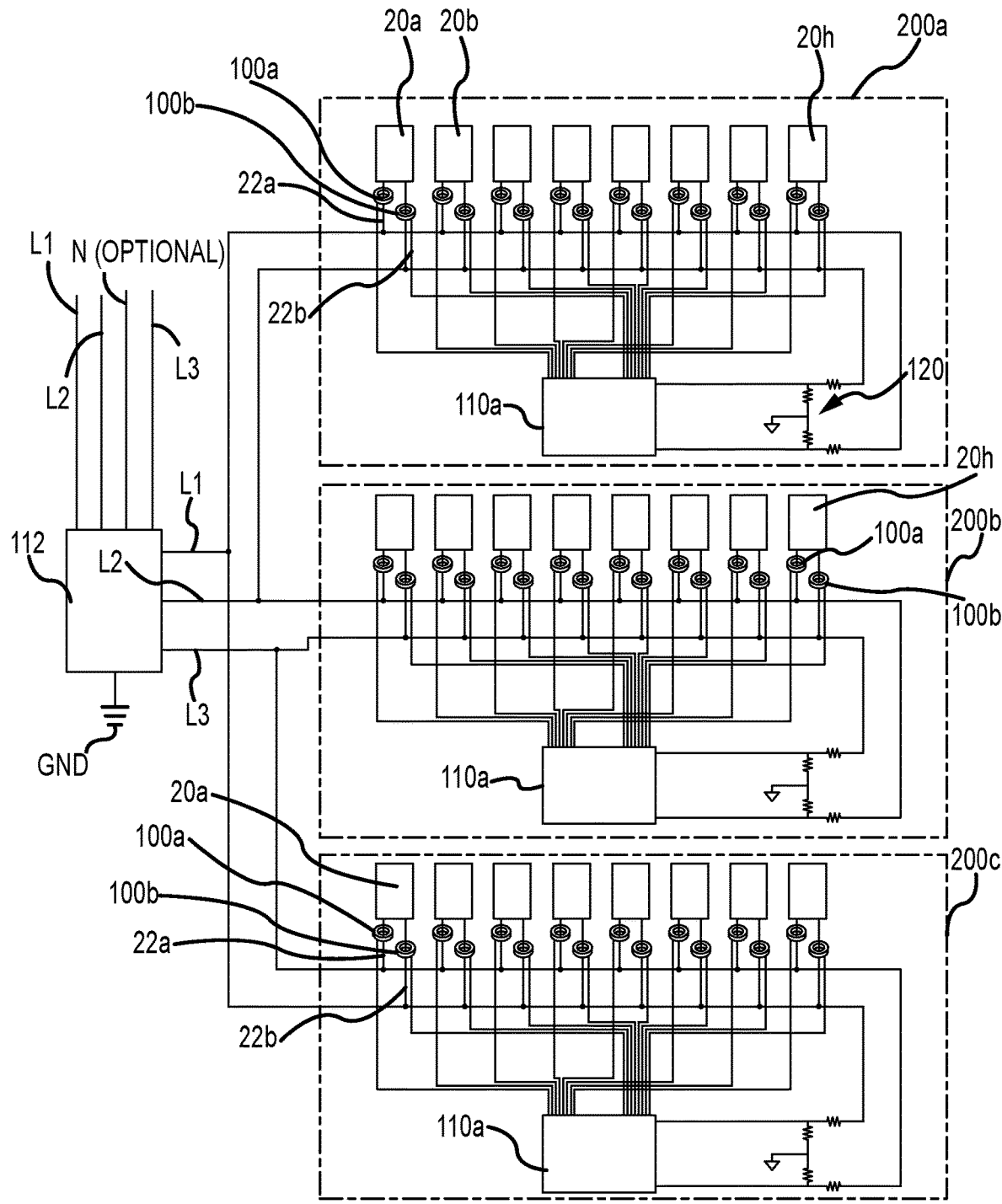
FIG. 4 is a block diagram of another preferred embodiment of an outlet module for use in the PDU of FIG. 1.
Figure 5:
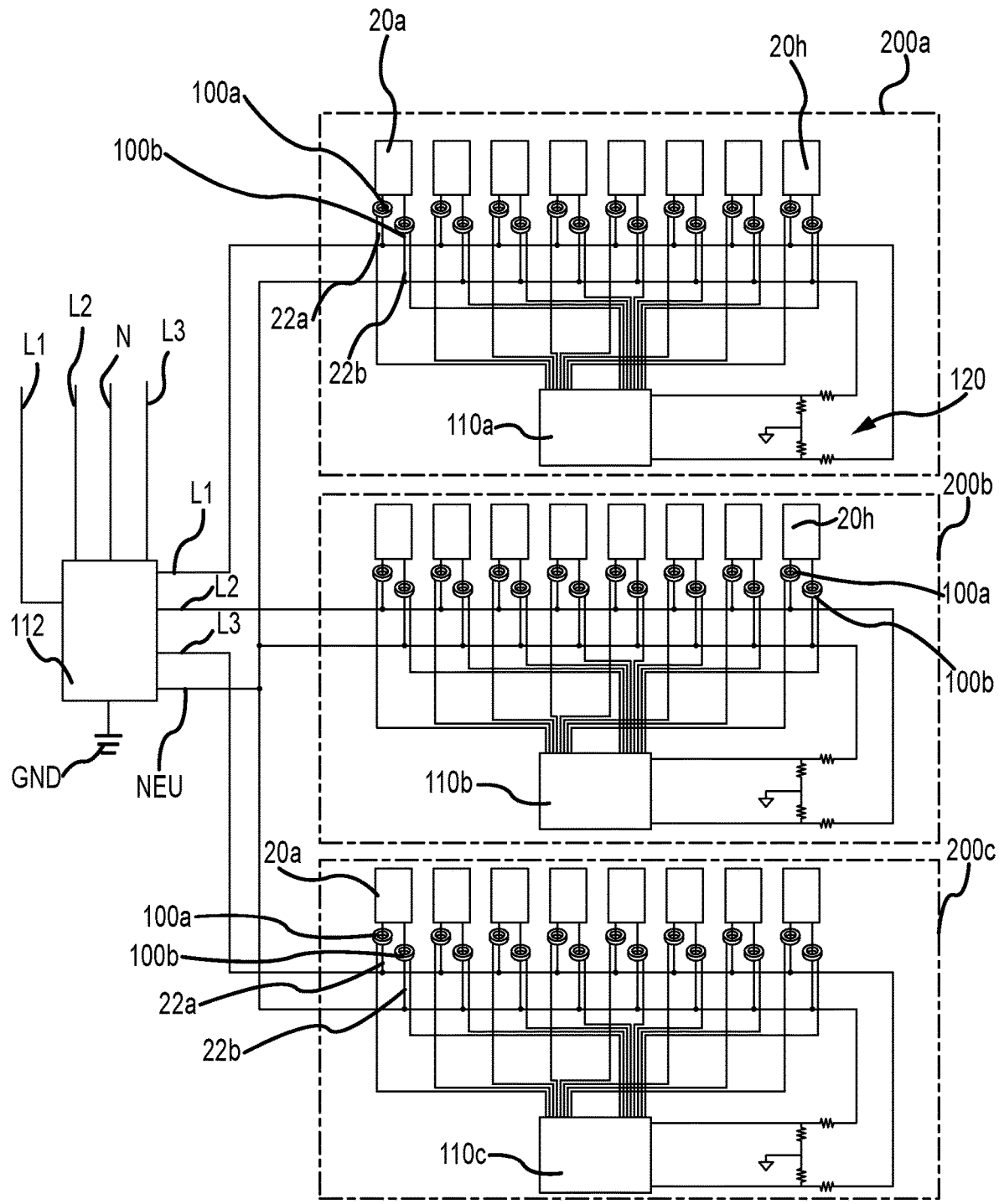
FIG. 5 is a block diagram of yet another preferred embodiment of an outlet module for use in the PDU of FIG. 1.

Shown in FIGS. 3-5 are block diagrams of the preferred outlet modules 200 and RCM circuits 100 electrically connected to a power input through an internal power supply or source 112 of the PDU 10. The power source 112 includes a plurality of conductors to carry one or more phases of a power input to the PDU 10. As shown, each outlet 20a-20h of the module 200 has two or more connectors 22 for electrically connecting to two conductors of the power source 112. Each outlet 20a-20h also includes an associated preferred residual current monitoring circuit 100. Each residual current monitoring circuit 100 includes a first current sensor 100a associated with one connector 22a of the outlet 20 and a second current sensor 100b associated with another connector 22b of the outlet 20. The preferred differential detector 110 is electrically connected to each current sensor 100a, 100b to receive the respective current sense output of the current sensors 100a, 100b of each outlet 20 in the module 200. Preferred embodiments of the outlet modules described herein can include a voltage sensing resistor network 120 to determine voltage at each outlet 20a-20h along with other power related parameters as described herein. Each outlet 20a-20h is also interconnected to a ground GND in the power source 32, although these connections from outlets 20a-20h are not illustrated in FIGS. 3-5.

Specifically shown in FIG. 3 is an illustrative embodiment of the preferred module 200 electrically connected to two conductors L1, L2 of a power source 112. Depending upon the configuration of the power source 112, the first conductor L1 can be connected to line power in the power source 112, and the conductor L2 can be connected to neutral in the power source 112. Accordingly, the outlet module 200 can be configured with each outlet 20 having one connector 22a electrically connected to the first conductor L1 carrying line power and the other connector 22b electrically connected to the second conductor L2 as a neutral conductor. Alternatively, in a polyphase configuration of the power source 112, the conductors can be connected to different phases of the power source 112. Thus, for example, each outlet 20 of the module 200 can have one connector 22a electrically connected to the first conductor L1 carrying a first phase of line power and the other connector 22b electrically connected to the second conductor L2 carrying a second phase of line power.

In the case of a polyphase power source 112, the PDU 10 can have either a delta or a wye power input configuration as respectively shown in FIG. 4 and FIG. 5. As shown in FIG. 4, the power source 112 is configured with a three-phase power input in a delta configuration and having a first conductor L1 carrying a first phase, a second conductor L2 carrying a second phase, and a third conductor L3 carrying a third phase. The preferred PDU 10 of FIG. 4 shows three outlet modules 200a, 200b, 200c with outlets 20 electrically connected to the conductors L1, L2, L3 in varying combinations. More specifically, the outlet connectors 22a, 22b of the first module 200a are electrically connected with the first and second conductors L1, L2, the outlet connectors 22a, 22b of the second module 200b are electrically connected with the second and third conductors L2, L3; and the outlet connectors 22a, 22b of the third module 200c are electrically connected with the first and third conductors L2, L3. Alternatively or additionally, the input power to the power source can include a neutral line N. Thus, for example, any conductor 22b with a current sensor 100b for detection of a return current can be electrically connected to a conductor or neutral. Each module 200a, 200b, 200c preferably includes a microcontroller 110a, 110b, 110c to receive the current sense outputs from the respective associated current sensors 100a, 100b of each outlet 20. With a differential determined between current carried in the connectors 22a, 22b of the outlets 20, the microcontrollers 110a, 110b, 110c can thus detect residual current or leakage for each outlet 20 of the respectively associated module 200a, 200b, 200c.

With a neutral line, the power input can have either a delta or a wye configuration. Shown in FIG. 5 is the power source 112 with the power input in a wye configuration. The power source 112 is shown with four conductors including a first conductor L1 carrying a first phase, a second conductor L2 carrying a second phase, a third conductor L3 carrying a third phase and a fourth conductor N at neutral. Each outlet 20 in each module is electrically connected to the neutral conductor N preferably for return current detection with the secondary current sensor 100b. The outlets 20a-20h within a common outlet module 200 are preferably connected to a common conductor of input power and different modules 200a, 200b, 200c are electrically connected to conductors of different phase input power. The preferred PDU 10 of FIG. 5 shows the first connectors 22a of the outlets of the three outlet modules 200a, 200b, 200c respectively electrically connected to the conductors L1, L2, L3. The associated current sensor 100a for the first connector 22a in each outlet 20 detects the current supplied to the outlet. Again, each outlet module 200a, 200b, 200c preferably includes a microcontroller 110a, 110b, 110c to receive the current sense outputs from the respective associated current sensors 100a, 100b of each outlet 20a-20h. With a differential determined between current carried in the connectors 22a, 22b of each outlet, the microcontrollers 110a, 110b, 110c can thus detect residual current or leakage for respectively associated module 200a, 200b, 200c on a per-outlet basis.

Shown in FIGS. 6-7 are perspective views of a preferred outlet assembly that includes two current sensors 100a, 100b for use in residual current monitoring. The outlet 20' generally includes a core body 220 in which two or more connectors 222 are affixed within the body to electrically connect to a power supply conductor for supplying power to a device or asset plugged into the outlet 20'. Preferred embodiments of the outlet assembly can be constructed as the combination outlets shown and described in U.S. Patent Application Publication No. 2021/0288434 filed Mar. 16, 2020; U.S. Pat. No. 10,249,998, filed Jul. 13, 2017; and U.S. Pat. No. 10,498,096, filed Apr. 1, 2019, the disclosures of which are hereby incorporated by reference in their entireties.

The outlet assembly 20' includes a preferred core body 220 having an input face side 220a and an opposite base side 220b with three apertures 220c extending therebetween. The core 220 can be formed from injection molded plastic, for example, with an outer surface configured to mate with a one or more connector type. For example, the outer surface of the core 220 can be configured as a C13 outlet to mate with a C14 plug with rectangular apertures 220c to receive correspondingly oriented terminals. The outer surface or apertures 220c of the core can alternatively be configured to receive two or more types of plugs, i.e., a "combination outlet," as shown and described in U.S. Pat. No. 10,498,096 (incorporated herein by reference) and as illustratively shown in three cores of the module 200' of FIG. 8 having T-shaped apertures for receiving two types of plugs.

Referring again to FIGS. 6 and 7, the outlet assembly 20' can include a first power terminal 222a and a second power terminal 222b extending from the base side 220b. The outlet 20 can include a ground terminal 222c to define a third connector for electrical connection to a ground conductor of the power supply, such as for example, ground conductor GND. The terminals 222a, 222b, 222c can be constructed from suitable electrically conductive materials such as tin, gold, silver, copper, phosphor bronze, and the like. Multiple materials can be used in combination. In one embodiment, the terminals can comprise copper alloy with a tin plating. The standard outlet/plug types (e.g., C13, C14, C19, and C20) all refer to industry standard connectors defined in International Electro technical Commission (IEC) standard publication IEC60320 as of the filing date of the present application. Although the embodiments are shown and described with respect to C13/C14 and C19/C20 outlets/plugs, other combinations could be used. Other suitable connector types might include, for example and without limitation, industry standard outlets/plugs, such as IEC C2, C4, C6, C8, C10, C12, C16, C16A, C18, C22, C24 or NEMA 5-10R, 5-15R, 5-20R, 6-20R, 6-30R, 6-50R, L15-20R, L15-30R, L21-L21-30R.

Included in the outlet assembly 20' and shown in the exploded views of FIGS. 6 and 7 are preferred embodiments of the current sensors 100a, 100b in an associated engagement with the first and second terminals 220a, 220b of the outlet 20'. The current sensors 100a, 100b can be embodied as a toroidal current sense transformer, such as for example a current transformer (CT). A preferred current transformer (CT) for use is manufactured by Shenke Electronics Co., Ltd of Hebei, China under their Part No. 1HKW.506.6940.1C. An exemplary CT has a maximum primary operating current of 40 A, a 1:2000 turn ratio, and a burden resistance of 100. In the preferred embodiment shown, the current sensors 100a, 100b are current transformers with output lines comprising two output leads 102a, 102b. The preferred current transformers (CT) 100a, 100b are annular with the power terminals 222a, 222b of the outlet 20' extending through the annular opening of the sensors 100a, 100b to associate sensors and the outlet 20' with one another. The current sensed output from the sensors 100a, 100b is proportional to the magnitude of the current flowing through the conductor or power terminal 222a, 222b associated with the sensor 100a, 100b. In preferred embodiments of the outlet assembly the current sense output of the sensors 100a, 100b can be output on the two output leads 102a, 102b in each sensor across a burden resistor. Alternatively or additionally, one or more of the residual current monitoring circuits 100 can include, in addition to the current sensors 100a, 100b and associated microcontroller, a burden resistor and anti-aliasing filter.

Figure 8:
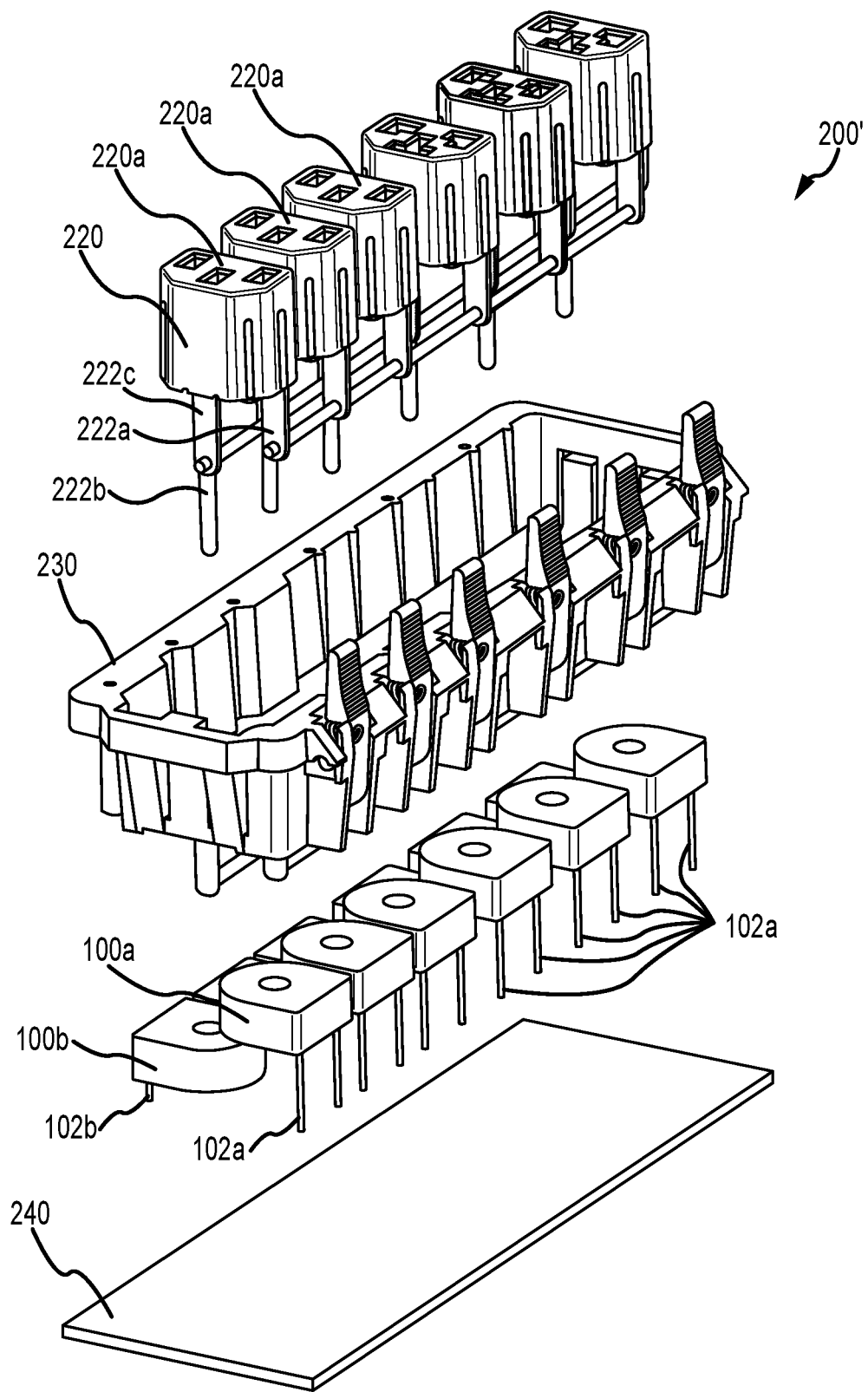
FIG. 8-9 are various exploded perspective views of a preferred embodiment of an outlet module for use in the PDU of FIG. 1.
Figure 9:
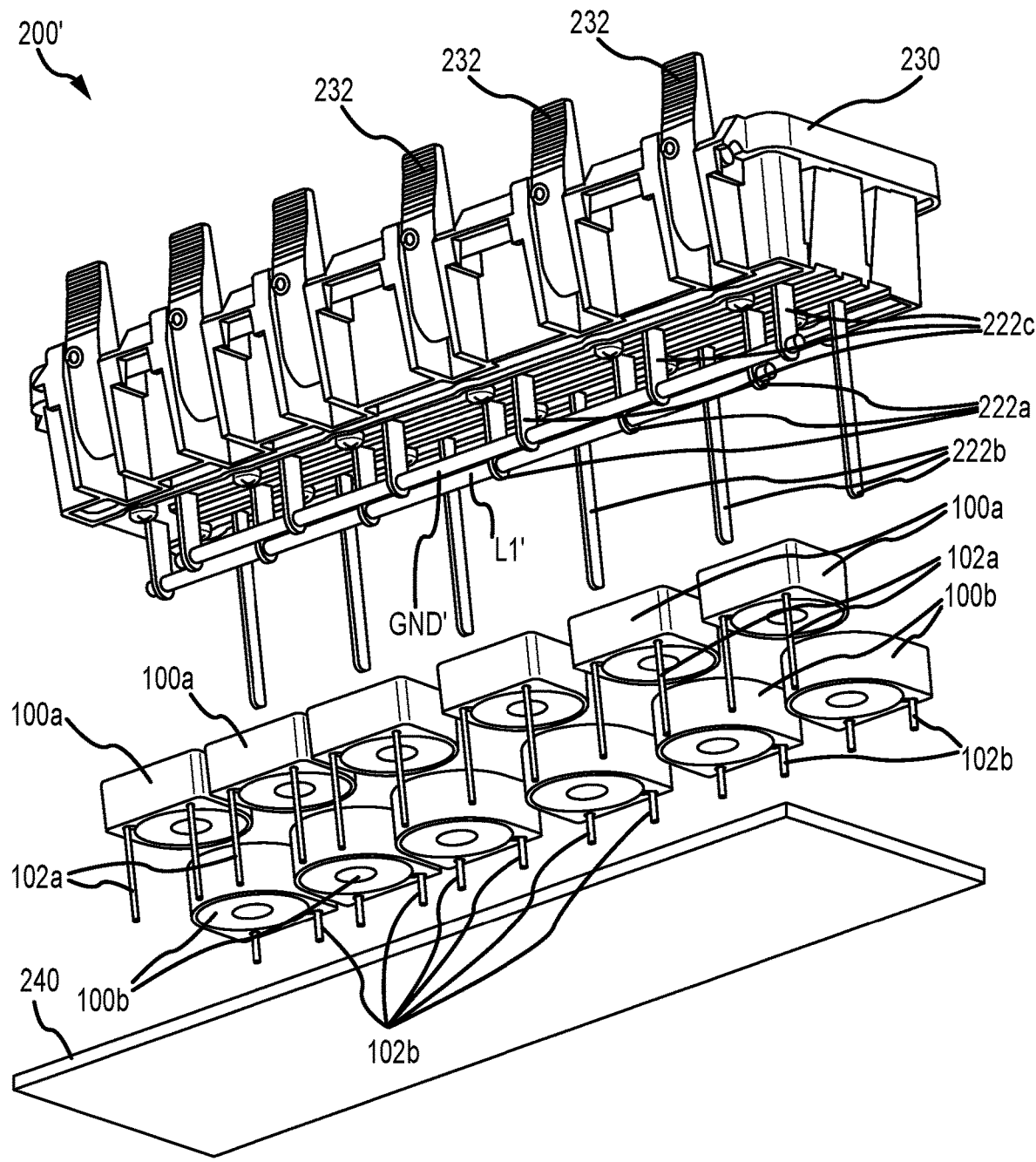
Figure 10:
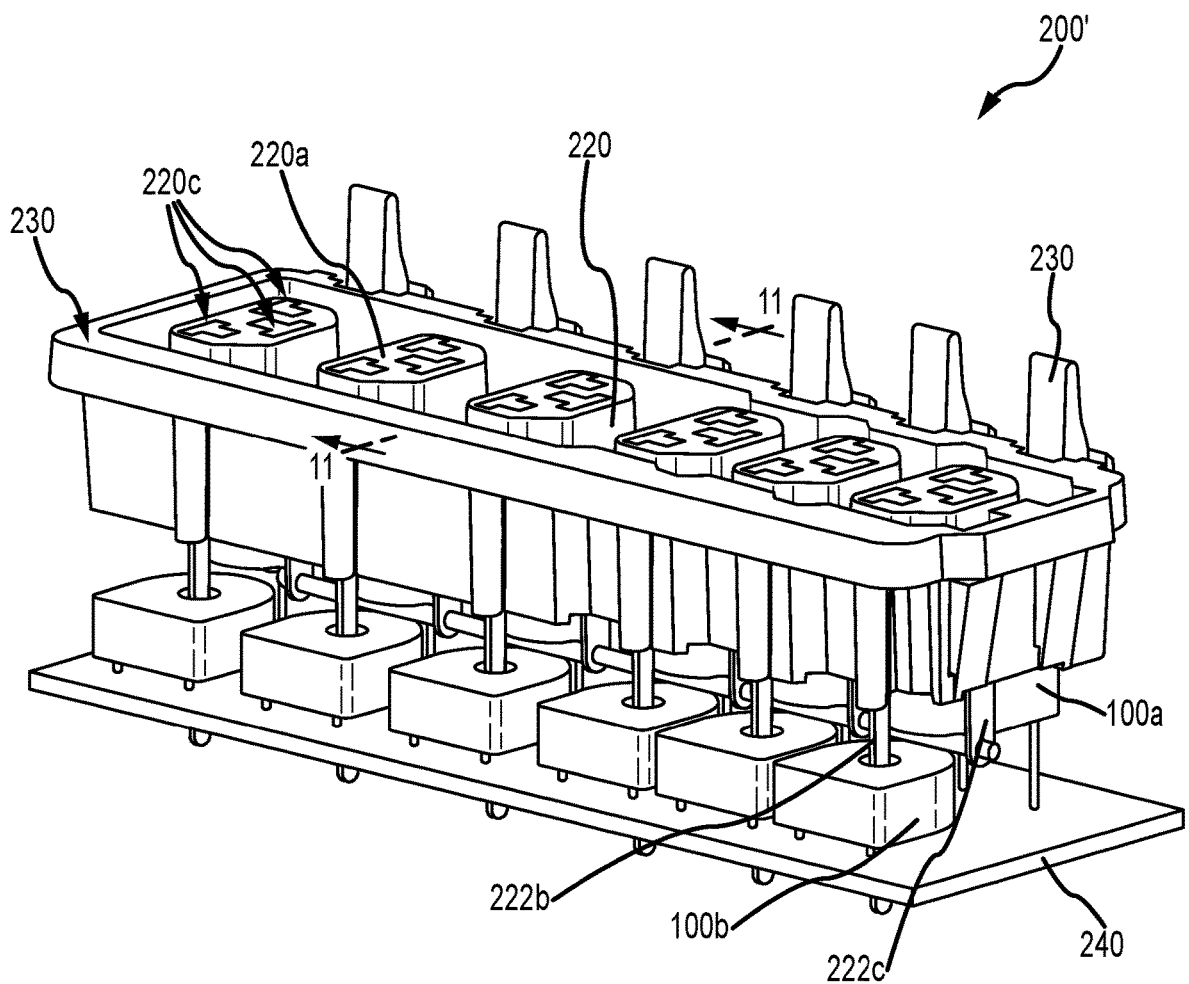
FIG. 10 is a perspective view of the outlet module of FIGS. 8-9.
Figure 11:
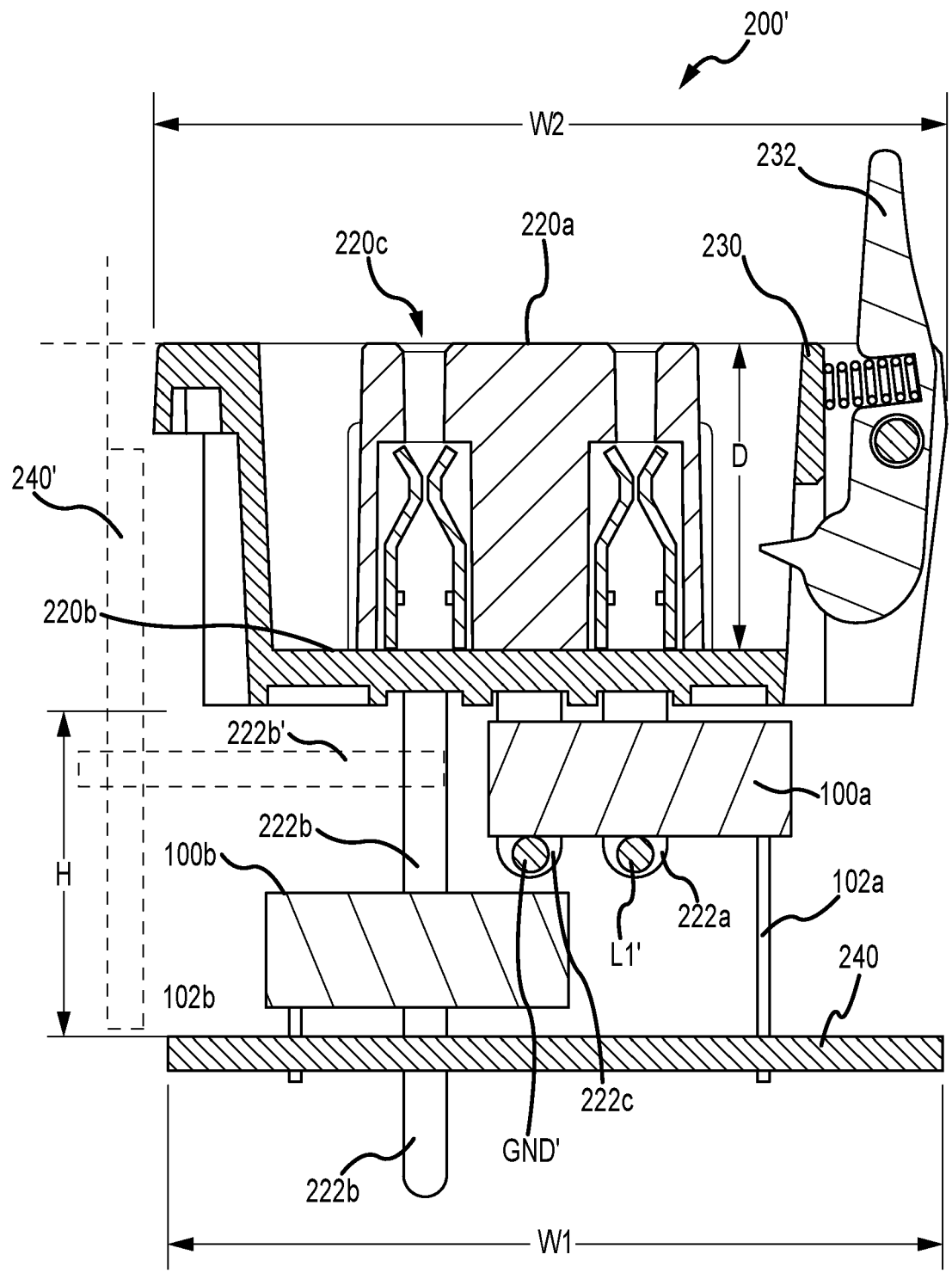
FIG. 11 is a cross-sectional view of the outlet module of FIG. 10.

Shown in FIGS. 8-10 are various exploded views of a preferred module 200' assembled with six outlets 20'a-20f disposed within a module tray or housing 230 and engaged with preferred toroidal current sensors 100a, 100b. The sensors 100a, 100b are preferably mounted with the respective output leads 102a, 102b mounted to a printed circuit board PCB 240. Accordingly, the two sensors 100a, 100b are disposed between the outlet cores 220 and the PCB 240 and more preferably disposed between the module housing 230 and the PCB 240. Shown in FIG. 11 is a cross-sectional view of the preferred outlet module 200'. The module 200' is assembled to fit within the housing 12 of the PDU 10 preferably in a compact manner with the pair of sensors preferably located within the width W1 of the PCB 240 and/or within the width W2 of the module housing 230. In the preferred embodiment shown, the current sensors are offset from one another with one sensor 100b mounted closer to the PCB 40 than the other current sensor 100a. Moreover, the sensors 100a, 100b can partially overlap one another provided the sensors 100a, 100b can be mounted to the PCB 240. For embodiments in which the pairs of current sensors 100a, 100b are off-set or stacked in the assembly, the overall height H of the space between the PCB 240 and the housing 230 which houses the sensors 100a, 100b is preferably less than two times (2×) the depth D of the housing 230 and one to one to 1½ times (1×-1½) the depth D of the housing. Alternatively, the sensors 100a, 100b can be mounted to the PCB 240 so as to be in a common plane with one another. The cores 220 of each outlet 20a-20e are preferably oriented within the housing 230 such that each face 220a is disposed in a common plane. The preferred module 200' includes one PCB 240 for mounting each of the first current sensor 100a and the second current sensor 100b. Alternate embodiments of the module 200' can include at least two printed circuit boards for mounting the two current sensors 100a, 100b on different PCBs. As shown, the one or more PCBs 240 can be oriented parallel to the common plane of the core faces 220a. Alternatively, as shown in phantom FIG. 11, one or more PCBs 240' and one or more connectors 222b' can be oriented to locate the PCB 240' and associated mounted current sensors (not shown) perpendicular to the core faces 220a.

Figure 11A:
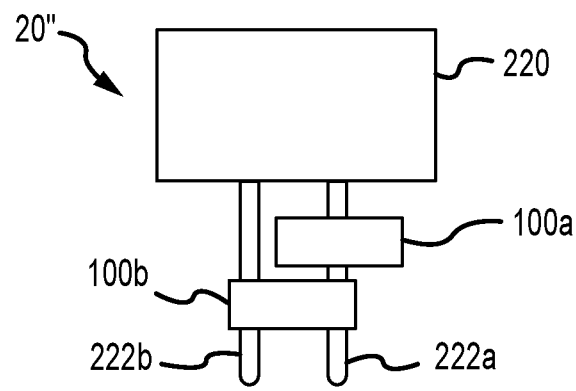
FIGS. 11A-11B are schematic views of alternate embodiments of an outlet module for use in the PDU of FIG. 1.
Figure 11B:
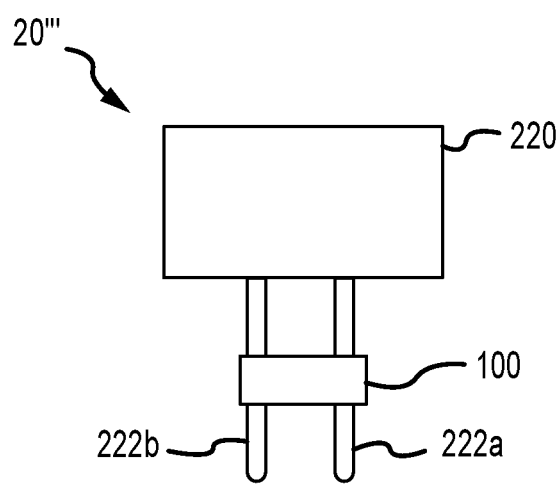

Shown in FIGS. 11A and 11B are schematic view of alternate embodiments of the outlet assembly for use in the outlet modules previously described. Generally, each alternate embodiment of the outlet assembly includes one or more current sensors arranged about one or more power terminals to provide a residual current monitor for the associated outlet. Specifically shown in FIG. 11A, are two current sensors 100a, 100b in which one sensor is disposed about two or more power terminals. As shown, the first current sensor 100a is disposed about the first power terminal 222a of the outlet assembly 20" to sense current supplied to the outlet through the terminal 222a; unlike the previously described embodiments, the second current sensor 100b of the assembly is disposed about both of the first and the second power terminals 222a, 222b for residual circuit monitoring for the outlet assembly 20". By incorporating this alternate embodiment of the outlet assembly 20" into an outlet module 200, residual current monitoring on a per-outlet basis can be provided with one or more of the outlets having one sensor 100a for supplied current sensing and a separate sensor 100b for residual current monitoring.

Shown in FIG. 11B is another alternate embodiment of an outlet assembly 20" with a single current sensor 100 disposed about each of the first and second power terminals 222a, 222b for residual current monitoring only, and not current monitoring. Accordingly, by incorporating this alternate embodiment of the outlet assembly 20"' into an outlet module 200, residual current monitoring on a per-outlet basis can be provided with one or more of the outlets having a single sensor 100 specifically for residual current monitoring.

Referring again to FIG. 11, the power terminals 222a, 222b, 222c can be constructed and assembled within the module 200' in a manner similar to those shown in U.S. Patent Application Publication No. 2021/0288434, which is incorporated by reference. To define the preferred spacing between the module housing 230 and the PCB 240, the second terminal 222b can be disposed so as to extend to each side or through the PCB 240. Moreover, one or more of the power terminals 222a, 222c of the outlets can be ganged together by a common conductor. For example, each of the first conductors 222a in each outlet 20a-20e have an aperture 226 formed therein through which a common conductor, such as, for example, first conductor L1 can extend. Similarly, a third conductor 222c of each outlet 20a-20e can have an aperture formed therein to receive a ground conductor GND' tied to ground and gang the third conductor 222c to one another.

The base side 220b of the core 220 can be configured for mounting within the module housing 230 as shown herein. The outlets 20a-20e can be equidistantly spaced apart from each other or at varying distances from one another. The outlets can also define a clearance or space between the core 220 and the internal walls of the housing in order to accommodate varying plug types. The outlets 20a-20e can have an unobstructed space between adjacent outlet cores 220, or alternatively there can be a wall extending between each outlet. Without a space or wall between outlets, the module 200' can be configured with a high density outlet design as further described in commonly owned U.S. Pat. Nos. 9,614,335 and 9,627,828, each of which is incorporated herein by reference. The housing 230 can include one or more latch levers 232 which operate or pivot to retain or remove a plug engaged with an outlet of the module 200'. The levers 232 can be constructed and installed as shown in U.S. Patent Application Publication No. 2021/0288434. The latch lever 232 can be pivotably coupled to the housing 230 adjacent each one of the outlets 20a-20e. Each latch lever 232 is moveable (e.g., pivotable) between a latch position whereby a mating plug can be inserted and retained therein, and an unlatch position whereby the mating plug can be removed from the module 200'.

A differential detector, preferably embodied as a microcontroller (not shown), can be mounted to the PCB 240 of each preferred outlet module 200'. An exemplary microcontroller for use in the PDU 10 is a 32 bit ARM Cortex M4 (with embedded DSP core) from STMicroelectronics and identified by Part No. STM/STM32F446ZC. The microcontroller 110 can determine other current and power related parameters of the outlet module 200 and PDU 10. More preferably, the microcontroller 110 is configured to monitor, detect and report power-related parameters on a per outlet basis as shown and described in any one of U.S. Pat. Nos. 8,321,163; 8,305,737; 8,694,272 or and 9,952,261, each of which is incorporated by reference. Accordingly, with reference to FIG. 2, each of the modules 200*a*, 200*b*, 200*c* ... 200*n* of the preferred PDU 10 preferably includes, in addition to the preferred residual current monitoring circuit 100 and voltage sensing circuit 120, a relay device 140 and relay driver circuit 150 each electrically connected to the microcontroller 110. Thus, each module 200*a*, 200*b*, 200*c* ... 200*n* is preferably configured as an intelligent outlet module of the PDU 10. Moreover, the PDU can include a residual current monitor at the input cord. As shown in FIG. 2, the PDU can include an internal input cord residual current monitor 160 having one or more current sensors in which a single or polyphase input cord is associated with a current transformer (CT) to detect current leakage. In addition, the PDU can include an input power meter 161 with an upstream RCM, as illustratively shown, or a downstream RCM (not shown). The current sensors of the input cord residual current monitor 160 are preferably of the Type B measuring AC currents (up to 2000 Hz) as well pulsating and smooth DC currents in accordance with IEC-60755. Preferred embodiments of the PDU provide for residual current monitoring at the outlets for AC currents preferably ranging from 42-2000 Hz.

By providing the preferred embodiments of PDU 10 with residual current monitoring as described herein, maintenance personnel can be provided with additional fault isolation information to allow them to correct a fault condition and restore the affected IT equipment with minimal impact to system uptime. As with the PDUs of U.S. Pat. No. 9,952,261, preferred embodiments of the PDU 10 can be configured with "Per Outlet Power Sensing" or ("POPS") which refers to the concept of detecting a load coupled to each outlet and monitoring power consumption at each outlet. Thus, because the preferred microcontrollers 110 of the outlet modules receive current information for each outlet 20 of a module 200, along with voltage information, load detection along with various power-related metrics can be calculated for each outlet and this information can be reported through the network 4 to the network power manager 6 or other network connected computer or device. The microcontrollers 110 can be interconnected to a communications bus (such as an RS485 bus, I2C bus or SMBus). Preferred embodiments of the PDU 10 can include the microcontroller 110 to report over the network 4, for each outlet: (a) residual current (RC); (b) voltage RMS (Vrms); (c) current RMS (Irms); (d) Apparent Power (VA); (e) Active Power (W); (f) Power Factor (pF); and (g) crest factor. This data may be received by an external system that collects the outlet information for which the data is provided and used to determine metrics or provide information such as described above. With an Internet interface, monitoring power consumption at each outlet provides detailed power information and allows grouping of outlets to determine kilowatt consumption per device, group of devices, PDU, or cabinet. Power consumption can also be determined per rack, rows of racks, an entire data center, or the like by clustering outlet information across multiple IP addresses and PDUs, as discussed above. This can provide consolidated PDU information within a data center or across multiple locations, a centralized location to view power and environmental status, capacity planning, reports and trends, multiple views, auto discovery of all PDU devices, alarm details, an ability to manage PDUs, global or individual outlet control, and logging.

Those of skill will appreciate that the various illustrative logical blocks, modules, circuits, and algorithm steps described in connection with the embodiments disclosed herein may be implemented as electronic hardware, computer software, firmware, or combinations thereof. To clearly illustrate this interchangeability, various illustrative components, blocks, modules, circuits, and steps have been described above generally in terms of their functionality. Whether such functionality is implemented as hardware, software, and/or firmware depends upon the particular application and design constraints imposed on the overall system. Skilled artisans may implement the described functionality in varying ways for each particular application, but such implementation decisions should not be interpreted as causing a departure from the scope of the present invention.

For a hardware implementation, the processing units may be implemented within one or more application specific integrated circuits (ASICs), digital signal processors (DSPs), programmable logic devices (PLDs), field programmable gate arrays (FPGAs), processors, controllers, microcontrollers, microprocessors, electronic devices, other electronic units designed to perform the functions described herein, or a combination thereof. For a firmware and/or software implementation, the methodologies may be implemented with modules (e.g., procedures, functions, and so on) that perform the functions described herein.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A power distribution unit comprising:
a power distribution unit housing;
a power source disposed in the housing, the power source including a plurality of input conductors; and
a plurality of outlets disposed in the housing, each outlet in the plurality of outlets having:
a plurality of connectors including a first connector electrically connected to one input conductor and at least a second connector electrically connected to a different input conductor;
an associated residual current monitoring circuit including:
at least one current sensor associated with the first and the at least second connectors; and
a differential detector electrically connected to the at least one current sensor to determine a residual current.

2. The power distribution unit of claim 1, wherein the at least one current sensor includes a first current sensor associated with the first connector to define a first current sense output and a second current sensor associated with the at least second connector to define a second current sense output, the differential detector determining a current difference between the first current sense output and the second sense output.

3. The power distribution unit of claim 2, wherein the plurality of input conductors include a first phase conductor and at least another phase conductor, at least one outlet in the plurality of outlets having the first connector electrically connected to the first phase conductor and the second connector of the at least one outlet electrically connected to the other phase conductor.

4. The power distribution unit of claim 3, wherein the plurality of input conductors includes a second phase conductor and a third phase conductor, the second connector of the at least one outlet being electrically connected to one of the second phase conductor or the third phase conductor.

5. The power distribution unit of claim 4, further comprising another outlet in the plurality of outlets having the first phase connector electrically connected to the second phase conductor and the second phase conductor electrically connected to the third phase conductor.

6. The power distribution unit of claim 5, wherein the power source defines a delta configuration.

7. The power distribution unit of claim 6, wherein the at least second phase conductor comprises a neutral conductor, the power source defining any one of a single-phase power source or a polyphase power source having either a delta configuration or a wye configuration.

8. The power distribution unit of claim 7, wherein the input power defines either a wye configuration or a delta configuration.

9. The power distribution unit of claim 1, wherein the plurality of input conductors includes a first phase conductor, a second phase conductor, a third phase conductor, and a neutral conductor, at least one outlet in the plurality of outlets having the first connector electrically connected to one of the first phase conductor, second phase conductor or third phase conductor and the second connector of the at least one outlet electrically connected to the neutral conductor.

10. The power distribution unit of claim 1, wherein the differential detector comprises a microcontroller; and each of the first current sensor and the second current sensor is a toroidal current transformer.

11. The power distribution unit of claim 1, wherein each outlet includes a core body having a face defining a plurality of apertures with a first power terminal disposed within a first aperture of the plurality of apertures to define the first connector and a second power terminal disposed within a second aperture of the plurality of apertures to define the at least second connector.

12. The power distribution unit of claim 11, wherein the plurality of input conductors include a ground conductor, each outlet includes a ground terminal disposed within a third aperture of the plurality of apertures to define a third connector in the plurality of connectors electrically connected to the ground conductor.

13. The power distribution unit of claim 12, wherein the core of each outlet is oriented such that each face is disposed in a common first plane, each of the first current sensor and the second current sensor being mounted on at least one circuit board oriented in at least a second plane parallel to the first plane.

14. The power distribution unit of claim 13, wherein the at least one circuit board comprise two circuit boards, the first current sensor and the second current sensor being mounted on different circuit boards.

15. The power distribution unit of claim 12, wherein the core of each outlet is oriented such that each face is disposed in a common first plane, each of the first current sensor and the second current sensor being mounted on at least one circuit board oriented in at least a second plane perpendicular to the first plane.

16. The power distribution unit of claim 15, wherein the at least one circuit board comprise two circuit boards, the first current sensor and the second current sensor being mounted on different circuit boards.

17. The power distribution unit of claim 1, wherein the plurality of power outlets defines a module, each power outlet of the module being ganged together.

18. The power distribution unit of claim 17, wherein each power outlet of the module includes a terminal having an aperture formed therein, the module including a circuit conductor extending through the aperture of each terminal to gang the plurality of power outlets together.

19. The power distribution unit of claim 1, further comprising at least one voltage sensing network.

20. The power distribution unit of claim 1, wherein the residual current monitoring circuit monitors AC current ranging from 42-2000 Hz.

21. The power distribution unit of claim 1, further comprising an input power cord and an input residual current monitor associated with the input power cord.

22. The power distribution unit of claim 1, wherein the at least one current sensor includes a first current sensor associated with the first connector to define a first current sense output and a second current sensor associated with each of the first and the at least second connectors.

23. The power distribution unit of claim 1, wherein the at least one current sensor consists of a current sensor associated with each of the first and the at least second connectors.

24. An outlet module comprising:
at least one circuit board;
a first pair of current sensors mounted to the at least one circuit board;
at least a second pair of current sensors mounted to the at least one circuit board;
at least one differential detector mounted to the at least one circuit board to determine a difference between current sense output for each pair of current sensors; and
a first power outlet associated with the first pair of current sensors; and
at least a second power outlet associated with the at least second pair of current sensors.

25. The outlet module of claim 24, wherein the differential detector comprises a microcontroller; and each of the first pair of current sensors and the at least second pair of current sensors includes a toroidal current sense transformer.

26. The outlet module of claim 25, wherein each of the first and at least second power outlets includes a core having a face defining a plurality of apertures with at least a first power terminal disposed within a first aperture of the plurality of apertures and associated with one current sensor in the associated pair of current sensors; and a second power terminal disposed within a second aperture of the plurality of apertures associated with the other current sensor in the associated pair of current sensors.

27. The outlet module of claim 26, wherein the core of each outlet is oriented such that the face of each core is disposed in a common first plane, the at least one circuit board being oriented in at least a second plane parallel to the first plane.

28. The outlet module of claim 27, wherein the at least one circuit board comprise two circuit boards, the associated pair of current sensors being mounted on different circuit boards.

29. The outlet module of claim 26, wherein the core of each outlet is oriented such that the face of each core is disposed in a common first plane, the at least one circuit board being oriented in at least a second plane perpendicular to the first plane.

30. The outlet module of claim 29, wherein the at least one circuit board comprise two circuit boards, the associated pair of current sensors being mounted on different circuit boards.

31. An outlet module for use in a PDU, the outlet module comprises:
   a core having a face defining a plurality of apertures;
   a first power terminal disposed within a first aperture of the plurality of apertures;
   a second power terminal disposed within a second aperture of the plurality of apertures;
   a first current sensor associated with the first power terminal; and
   a second current sensor associated with the second power terminal.

* * * * *